United States Patent [19]

Francis

[11] Patent Number: 4,925,564
[45] Date of Patent: * May 15, 1990

[54] BACTERIAL INCUBATOR AND METHOD OF USE

[75] Inventor: John Francis, Cherry Hill, N.J.

[73] Assignee: Robert B. Grubbs, Orange, Calif.

[*] Notice: The portion of the term of this patent subsequent to Jun. 2, 2004 has been disclaimed.

[21] Appl. No.: 54,735

[22] Filed: May 27, 1987

Related U.S. Application Data

[63] Continuation of Ser. No. 705,138, Feb. 25, 1985, Pat. No. 4,670,149.

[51] Int. Cl.$^5$ .............................................. C02F 3/10
[52] U.S. Cl. .................................. 210/608; 210/610; 210/615
[58] Field of Search .............................. 210/615–618, 210/608, 610, 611, 150, 151

[56] References Cited

U.S. PATENT DOCUMENTS

| | | | |
|---|---|---|---|
| 2,051,727 | 8/1936 | Levine et al. ............................ | 210/7 |
| 2,183,657 | 12/1939 | Page ........................................ | 210/7 |
| 2,602,651 | 7/1952 | Cannon ................................... | 261/95 |
| 3,293,174 | 12/1966 | Robjohns ............................... | 210/17 |
| 4,005,010 | 1/1977 | Lunt ....................................... | 210/615 |
| 4,039,437 | 8/1977 | Smith et al. ...................... | 210/617 X |
| 4,077,877 | 3/1978 | Orensten et al. ................... | 210/615 |
| 4,086,161 | 4/1978 | Burton ............................. | 210/150 X |
| 4,165,281 | 8/1979 | Kuriyama et al. ................... | 210/17 |
| 4,333,893 | 7/1982 | Clyde ..................................... | 261/94 |

Primary Examiner—Tom Wyse
Attorney, Agent, or Firm—Thomas A. Lennox

[57] ABSTRACT

A bacterial incubator device to facilitate organic reduction of waste materials and method of placing it in the waste water collection system, such as in a grease trap, together with the addition of culture strains of bacteria with a high capacity for specific organic reduction, including an enclosure having a foraminous wall structure packed with high surface area elements such as spherical packing of a shape of size to multiply the solid bacterial growth surface area of the location in the sewage collection system and a weight device to cause the incubator to be positioned at the interface of floating scum matter and the water.

10 Claims, 2 Drawing Sheets

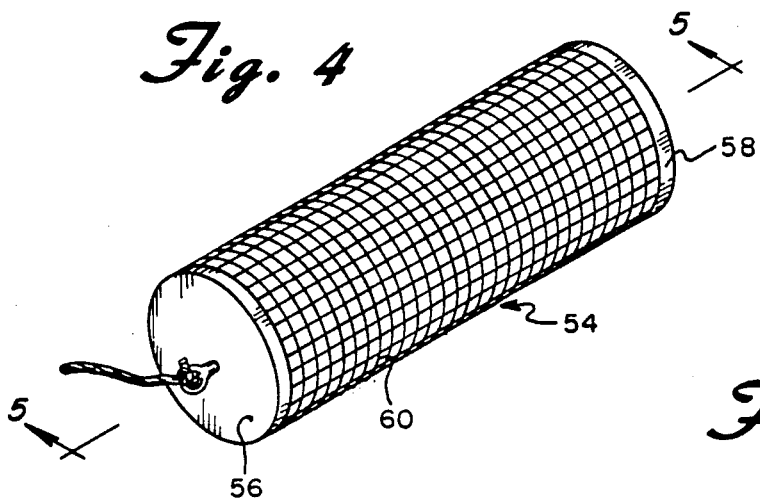
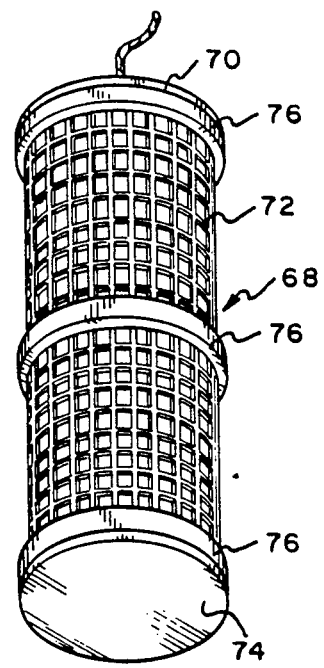
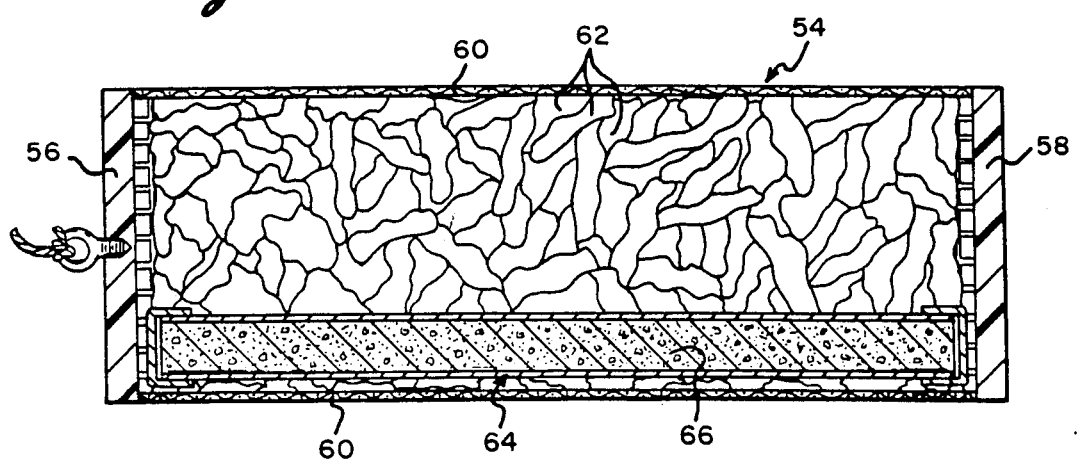

BACTERIAL INCUBATOR AND METHOD OF USE

This is a continuation of application Ser. No. 705,138, filed Feb. 25, 1985, now U.S. Pat. No. 4,670,149.

BACKGROUND OF INVENTION

This invention relates to a device to promote and facilitate the preliminary biological reduction of organic material in sewage and in waste water. In particular, this invention involves a device and method to reduce the grease and other organic materials which normally collects and deposits within waste water/sewage collection systems and/or the pretreatment of sewage within municipal sewage systems.

With increasing population concentration in most suburban and urban areas, it is necessary to collect the sewage from the individual residential, commercial and business sewage outflow and process it at a central location. At the treatment plant the sewage is treated to various stages allowing the resulting product to pass back into the ecological system. If left unchecked certain types of sewage outflow are too high in organic matter, such as grease such that the organic matter will clog the collection system at one or more of the critical points or will reach the primary sewage treatment plant and be essentially so indigestible by the ubiquitous bacteria present that it must be skimmed off and discarded in bulk after collection. With increases in population, present sewage treatment facilities are unable to process the increased volume of organic matter in the flow without significant capital investment in new equipment. Along the sewage transport lines to the treatment plant pumping stations are frequently located to transport the sewage to a higher elevation. These wet well locations serve as a collection point for grease and other organic matter that is not decomposed within the water flow. It is a common necessity to clean out the wet wells at pumping stations or other junction points in the system where floating grease and organic matter collects, hardens and remains there until it is removed by a pump to a truck. Lines with low flow rates, bends, and changes in elevation are also prone to build up organic deposits. Most states and municipalities have placed limitations on the quantities of oils and greases which may be introduced into the municipal sewage collection system. Most businesses and industrial companies generating grease in quanity are required to install a grease trap on the premises to collect the grease and prevent the bulk of it from entering the collection system. The grease collects in the trap until it is removed by hand or with a pump and truck.

Recently, an answer to the continuous removal and trucking away of the grease has been offered in the form of bacterial augmentation to maximize the effectiveness of organic decomposition. A bacterial supplement of highly-cultured strains of bacteria with an exceptionally high capacity for specific organic reduction are charged to the sewage system. These bacterial strains are designed to reduce the grease and convert it to lower molecular weight compounds which will not accumulate within the downstream sewage collection system. These bacteria operate almost exclusively in the water phase and their cultures grow at the grease/water interface on the sides and the bottom of the tank or trap in which they are placed. Those bacteria in the water phase are constantly washed out and passed down stream. Some of the bacteria are replenished by cultures that grow on the surface area of the walls of the trap. Apparently most are replenished by what grow at the grease to water interface. In addition, alien bacteria which compete with the supplemental bacteria constantly enter the system with fresh sewage. As a result, the highly cultured bacteria must be added frequently, as often as daily. When the source is generating a substantial amount of grease in areas of low detention time, the vast majority of the bacteria pass downstream and out into the transport system of the municipal sewer line. Many of these locations where grease collects are essentially anaerobic in nature. Anaerobic conditions slow the activity of common bacterial cultures.

Bacteria promoting devices are described in the following U.S. Pat. No. 2,051,727 to M. Levine et al, U.S. Pat. No. 2,183,657 to A.A. Page, U.S. Pat. No. 2,602,651 to M.R. Cannon, 3,293,174 to C.F. Robjohns, U.S. Pat. No. 4,005,010 to Lunt, U.S. Pat. No. 4,165,281 to Kuriyama et al, and U.S. Pat. No. 4,333,893 to Clyde. None of these devices satisfy the needs described above and do not attain the objects listed herein below.

SUMMARY OF THE INVENTION

It is object of this invention to degrade the organic matter in the waste water flow of the collection system prior to the flow reaching the sewage treatment plant thus allowing the plant to operate at higher capacities.

My invention involves a device and a method which essentially takes advantage of the problem locations along the waste water/sewage collection system to the primary sewage treatment plant. This device may also be used in the scum pit at the primary sewage plant, however, if it is used extensively at certain location points in the collection system, the problem of accumulation in the scum pit will be greatly reduced or eliminated. I have found a means to overcome the washout problems associated with the addition of special bacteria strains introduced for organic reduction at retention locations in the collection system.

Throughout the specification and claims reference is made to "waste water" treatment. This term is intended to be broad and to include sewage but not limit to the sewage collection system. For example, this invention is effective for use in grease traps which are purposely maintained in a parallel relationship to the balance of the waste water collection system. The grease from the trap may be reclaimed and for that reason is not considered to yet be in the sewage collection system.

My method includes choosing a location in the waste water collection system where there is significant detention time of the waste water and might be generally described as a "wide place in the road" of the collection system. This location is such that it might enjoy the benefits of bioaugmentation such as reducing the grease to an emulsifible mixture, odor control or the pretreatment of sewage to increase the efficiency of the treatment plant down stream. In this location, an organic scum including oils and greases collects on the surface of the liquid. Examples of these locations are grease traps, wet wells, and certain junction points where there is a flow restriction proximate to the surface of the liquid. A wet well location is particularly effective since the flow is intermittent, allowing periods of time for bacteria culture growth and attachment to surfaces.

In a typcial location offering significant detention time in the waste water flow, the effective surface area where bacteria cultures may attach and grow and ultimately find their way into the water phase is extremely limited. Each particular location provides surface areas on which bacterial culture growth can occur, such as walls, inlet and the outlet pipes at the grease water interface. Within sewerage pipes, the bacterial growth on the pipe itself serves as a constant source of supplemental organisms. The bacteria grow and produce colonies on the pipe which are continually scoured off by the flow of sewage. Sewers are designed to have enough slope to give a scouring velocity to prevent the deposition of egg shells, grit, etc. Grease traps, wet wells and locations do not have the scouring effect, so most of the effective surface area of growth for the replenishment of bacteria being washed out is only at the grease/water interface. In some locations, such as in a grease trap, bacteria may grow on the walls of the trap, but these colonies are not readily brought into the liquid phase. Therefore, there is almost no effective surface area except the thin line on the side walls at the interface between the scum and the liquid phase. There is also a small effective area on pipes and other elements inside the location located close to the scum/water interface.

After choosing a suitable location with significant detention time my invention includes placing, a bacterial incubation device in the liquid at the location and causing it to float at the interface of the organic matter layer and the liquid below. The incubator device provides a mulitiple increase in the effective solid surface area available for bacterial growth at the chosen location. The surface area of the bacterial incubator device is located at the critical interface so that it greatly increases the effective surface area for bacterial growth. After installation of the incubator means, the location is bioaugmented to maximize the effectiveness of the organic decomposition by adding a bacteria of a highly-cultured strain having a high capacity for specific organic reduction of the grease and other troublesome substances.

An effective bacterial incubator device includes an enclosure having a foraminous wall structure to allow essentially unimpeded fluid flow into, out of and through the enclosure. Packed inside the enclosure is a multiplicity of high surface area elements of a shape and size to allow liquid flow throughout the enclosure. A weight device in the incubator causes the device to be located within the area of the interface of scum and water layers at the chosen location in the waste water collection system. Of course, a weight device may be attached on the outside of the device and the weight device may be merely choosing certain construction materials for the incubator. The phase "in the incubator" is intended to include all of these alternatives.

DESCRIPTION OF THE DRAWINGS

FIG. 4 is a perspective view of another bacterial incubator device of the present invention.

FIG. 5 is a cross-sectional view taken along lines 5—5 of FIG. 4.

FIG. 6 is a perspective view of another embodiment of the present invention.

DESCRIPTION OF THE PREFERRED EMBODIMENTS

Figure 1:
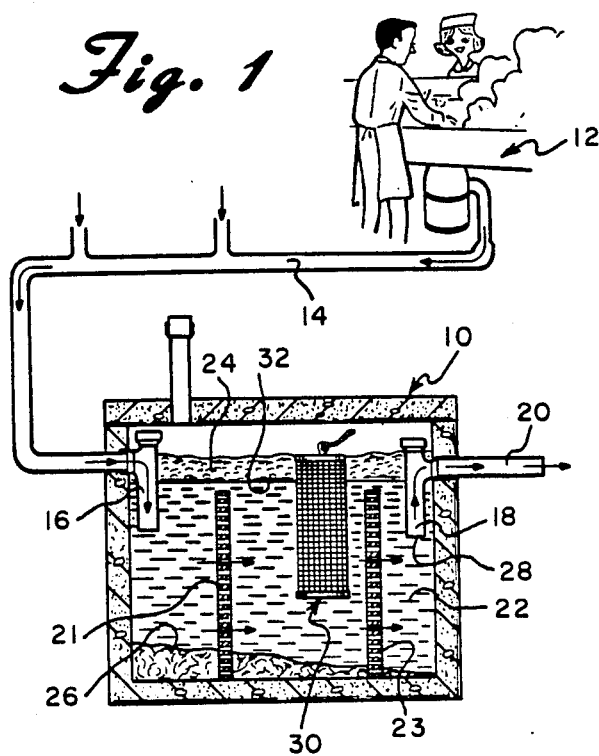
FIG. 1 is elevational diagram of a grease trap in which a bacterial incubator device of the present invention has been positioned.
Figure 2:
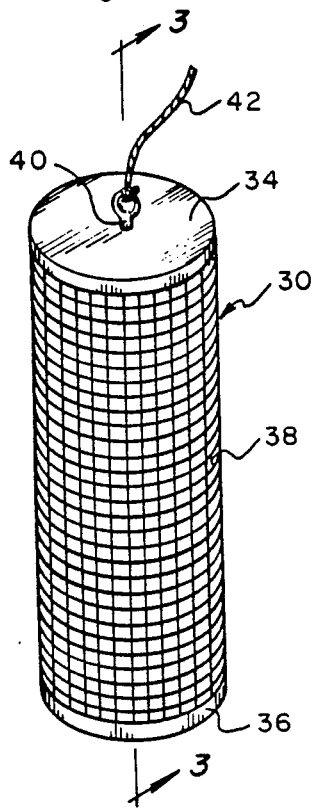
FIG. 2, is a perspective view of a bacterial incubator device of the present invention.
Figure 3:
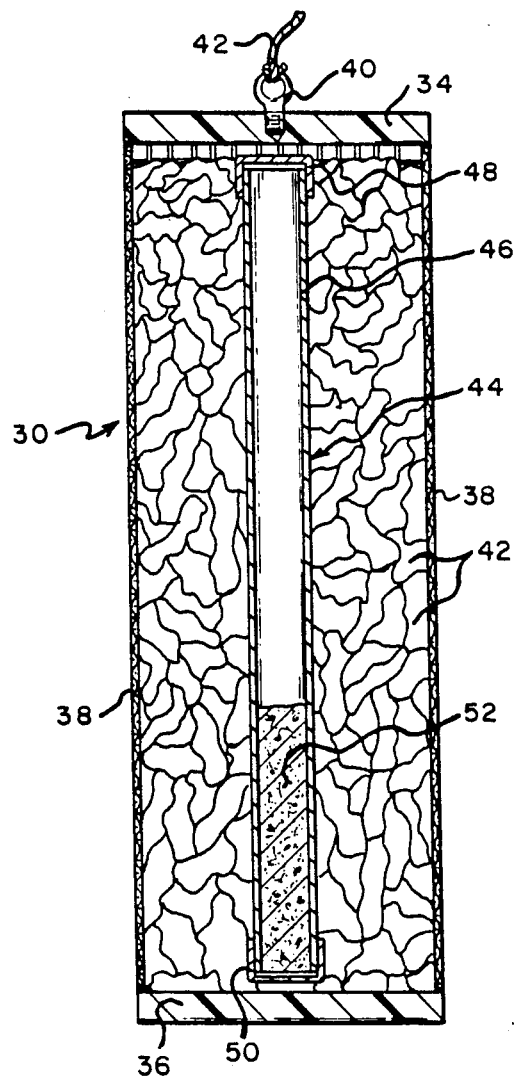
FIG. 3 is a partially cut-away, cross-sectional view taken along lines 3—3 of the incubator device of FIG. 2.

In FIG. 1, a standard grease trap 10 is pictured receiving sewage from a variety of sources including a heavy grease source such as low temperature dishwashing source 12 feeding through line 14. Grease trap 10 is an impervious solid container with inlet 16 terminating in a downwardly extending pipe to dispense sewage below liquid level in the trap. Outlet pipe 18 also extends downwardly opening below liquid level and extending upwardly to horizontal outlet pipe 20 the level of which determines the height of liquid 22 in the trap. Attached to the floor of grease trap 10 and extending vertically to a height just below the liquid height in the trap are metal baffles 21 and 23 which tend to cause separation of the grease from the flow passing through the baffles so that the grease collects in layer 24 floating on the top of liquid 22. Thus, grease layer 24 floats on top heavier than water sludge 26 collects on the bottom of trap 10. In this configuration, grease 24 collects on top of liquid 22 and can not pass out of outlet pipe 18 until grease has collected and filled the chamber down to height 28, the position of the opening of outlet 18. Bio-incubator device 30 floats in the liquid and is supported at interface 32 between the water liquid layer 22 and grease/oil layer 24. As pictured, bio-incubator device 30 is constructed to float in a vertical position with the bulk of its length extending into the liquid layer 22. As illustrated in FIG. 2, bio-incubator device 30 is constructed in a cylindrical shape having top end 34 and bottom end 36 to which screen 38 is attached. Eye bolt 40 is attached to top 34 to which cord 42 is tied to allow inspection or removal of device 30 from grease trap 10. The construction of the bio-incubator device 30 is more fully illustrated in the cross-sectional view of FIG. 3. The cylindrical enclosure of device 30 is essentially a tube of large aperture rigid plastic screen held in position by secure fastening to circular rigid polyethylene disc ends 34 and 36. The material of screen 38 and ends 34 and 36 is not critical but should be chosen so as to not deteriorate during use. Although plastic is preferred, the ends may be constructed of wood or aluminum and the screen of galvanized or stainless steel or aluminum wire. The enclosure holds packing 42 which is chosen to provide high surface area coupled with free liquid flow throughout device 30. The effective high surface area shaped elements are commerically available trickling filter balls which are two inch diameter hollow sphere shaped tripacked-S tower packing from Jaeger Tripac, Inc., Fountain Valley, California. These balls are injection molded having a multiplicity of internal cross members joining a multiplicity of circular elements generally in the structure of a sphere. These balls are typical elements that provide a high effective surface area not only compacted in a small space but providing a large number of interior corners and spaces which facilitate bacteria colony growth and yet provide excellent liquid flow through the balls and around the balls to disperse the bacteria in a controlled fashion in the liquid phase. Also effective are cooling tower "saddles" which are molded of polyethylene and constructed to avoid "nesting" and yet provide high surface area when used in the standard application for gas liquid interfaces. Typical tower packing materials are Super Intalox Saddles made by the Norten Corporation as well as the numerous packing structures described in U.S. Pat. No. 4,333,893 to R.A. Clyde mentioned earlier.

The packing material may be of any composition that will not deteriorate in the environments so long as it will provide area of sufficient liquid flow together with a multi-fold increase in surface area of the location. Using these packing materials, a surface area of about forty square feet may be concentrated in an incubator having an internal volume of about one cubic foot. It is preferred to provide a surface area in the range of about fifteen square feet to about 100 square feet in each incubator. It is more preferred to provide a surface area in the range of thirty to fifty square feet per incubator. A wide variety of materials may be use including not only balls, saddles and other typical cooling tower packing material but also fibrous materials including porous fiber plastic matting which provides little resistance to liquid flow through the matting but yet provides substantial surface area for culture growth. It is preferred that the packing material be hydrophobic to increase the tendency of the grease to reach into water layer. The choice of materials for the incubator container and the packing may attain the correct density to cause bio-incubator device 30 to float at the interface of grease and water layers in the sewage. In device 10 weight device 44 is included nesting and held in position at the central axis of device 30 by packing 42. Weight device 44 is constructed of 1½ inch polyvinyl chloride pipe 46 closed at both ends by caps 48 and 50 filled inside with high density stone gravel 52 to about ⅓ of the length of pipe 46. When bio-incubator device 30 is dropped into trap 10, weight device 34 positions it in a vertical position at the water/oil interface.

By its very nature, it is inexact to calculate the effective surface area for bacterial growth culture in a standard grease trap 10 on which the cultures may attach and grow. There has been no recognized need to date. In grease trap 10, the effective areas include the exterior surfaces of inlet and outlet pipes 16 and 18 together with the interior walls of trap 10. The balance of the interior surface is probably not an effective surface for bacteria growth that will find their way into the liquid phase near the grease. The only effective areas of the interior walls are the side walls relatively close to the interface between liquid and grease and the interface itself. The addition of bio-incubator 30 increases this effective area multi-fold.

FIG. 4 illustrates second embodiment bio-incubator device 54 which is shown in position as it operates horizontally in a grease trap. Device 54 is constructed essentially identically to that of device 30 with circular disc ends 56 and 58 holding cylindrical stainless steel screen 60 in position to hold polyethylene saddle packing 62 as further illustrated in FIG. 5. In this embodiment weight device 64 is positioned against an edge against screen 60 constructed identically to weight device 44, but in this embodiment filled with gravel 66. Thus, with removable caps on weight devices 44 and 64, the bio-incubator device may be adjusted to either float vertically horizontally or diagonally by the addition or removal of gravel and positioning of device 44. The vertical alignment places the greater surface area in the water phase while the horizontal position places the highest surface area at the interface.

In FIG. 6, bio-incubator device 68 is constructed of polypropylene one-half inch square screen held in position with polyvinylchloride twelve inch diameter rings 76. The bottom end of screen 72 is embedded in thermoset resin plastic casting 74 containing a sand filler. At the opposite end of screen 72 the ends of the screen are cast directly into foamed resin casting top 70. Suitable resins for casting include polyurethane and unsaturated polyester resins. Device 68 enclosing packing material floats vertically in the waste water location chosen.

Demonstration of the effectiveness of bio-incubator 10 is illustrated by the following procedure:

1. A commerical fast food restaurant generating a large quantity of oil and grease is equipped with a grease interceptor and over a period of about three months accumulates grease mat forming on top of the trap about two to three feet thick of solid organic matter. This mat requires removal at regular intervals.

A charge of bacteria cultures is mixed to bioaugment the grease trap. A mixture is prepared of:
  One pound Type A LOMA plus dry bacteria cultures supplied by Solmar Corp., 625 W. Katella Avenue, Orange, California 92667.
  Two gallons water The mixture is allowed to sit for four to six hours and then is poured directly into the sewer leading to the grease interceptor. This procedure is repeated on a daily basis at the end of the day for a period of five days. Thereafter, the dose is 2 to 3 ounces per day for 16 days.

At the end of the twenty-one day period, the top of the grease trap is removed and the grease mat is essentially gone except for a soft ring of grease attaching to the sides of the wall well above the present liquid level in the grease trap. The top of the liquid level is visible with some organic matter floating on the surface.

2. Continuous daily additions of the bacteria cultures maintains the grease in the trap in a nonaccumulating state for a period of thirty days. Failure to add the bacteria on a daily basis results in grease accumulation and adding the bacteria on a weekly basis allows a grease mat to begin reforming.

3. The above procedures are repeated except that a bio-incubator constructed similar to that of bio-incubator 10 described above is dropped into the grease pit and allowed to float at the grease/water interface in a vertical position. Bioaugmentation is continued for a period of thirty days, except that 7 to 14 ounces of bacteria is added at seven day intervals. At the end of thirty days, observation of the grease trap shows that no hard grease accumulator is forming and the quality of the grease in the trap is equivalent to that when bacteria was added on a daily basis.

The preferred incubator structure is a cylindrical screen tube with circular ends closing off the structure to enclose the packing material. The preferred packing material has a high surface area but it should be understood that a high surface area is merely a measure of the desired characteristics of the packing material. The bacterial colonies are three dimensional and certain shaped surfaces give a more effective three dimensional effect with the same surface area. For example, the spheres with a plurality of cross-members intersecting at various angles with the spherical elements and other cross-members provide intersections and angles which will support substantial and effective bacteria colonies and yet still not interfere with substantial flow through the incubator. On the other hand, the packing saddles provide a torturous flow route and many larger flat surfaces. The more complicated structural elements of the balls are preferred to provide a more effective surface area for colony growth and attachment. Fibrous materials provide a great deal of effective surface area for colony growth but tend to restrict liquid flow through the incubator so that large scale cross-members are preferred to fibrous mats. However, because of availability, shapes suitable for cooling towers providing a high surface area between liquid and gas phases are also effective for growth medium of bacteria cultures. The most preferred elements are polymeric plastic molded foraminous spheres having multiple cross-members inside the spheres that are presently used in trickle filters. The preferred weight device in the incubator is to include a high density filler in one end closure of the incubator and provide a low density end closure in the other end of the incubator, thus, encouraging the incubator to position itself in a vertical position. A preferred method of preliminary biological reduction of waste water flow includes choosing a location in the waste water collection system where there is a significant detention time in the flow. At this location, there typically will be an organic matter scum floating on the surface. A bacterial incubator device providing a multiple increase in the effective solid surface area of the location is placed at the location. The bacterial incubator device is caused to float at the interface of the scum and the liquid. A charge of bacteria is added to the waste water wherein the cultures have the high capacity for specific organic reduction.

While this invention has been described with reference to the specific embodiments disclosed herein, it is not confined to the details set forth and the patent is intended to include modifications and changes which may come within and extend from the following claims.

I claim:

1. A method of primary biological reduction of organic matter supported in an aqueous medium flowing through a flow system:

(a) choosing a passive median location in the flow system having minimal flow as a result of being a high volume collection area in the flow system, and having wall surface area in contact with the aqueous medium, (b) constructing a bacterial incubator means providing a multiple increase in effective solid surface area in contact with the aqueous medium over the wall surface area, the size of the incubator being insufficient to affect the passive nature of the location, (c) positioning the bacterial incubator means in the aqueous medium to float at the interface of the organic matter and aqueous medium, and (d) adding to the aqueous medium a charge of bacteria cultures having a high capacity for specific organic reduction.

2. The method of claim 1 wherein the location is a grease trap, a wet well or a scum pit in the flow system.

3. The method of claim 1 wherein the bacterial incubator means is a bacterial incubator device comprising:

(a) an enclosure having a foraminous wall structure to allow essentially unimpeded fluid flow into, out of, and through the enclosure, (b) a multiplicity of high surface area shaped elements packed into the enclosure of a shape and size to allow liquid flow through the enclosure, and (c) a weight means in the incubator to cause the incubator to be positioned at an interface of organic scum and water layers in the aqueous medium.

4. The method of claim 3 wherein the enclosure comprises a screen wall structure.

5. The method of claim 3 wherein the screen wall structure is tubular in shape.

6. The method of claim 3 wherein the elements are shapes suitable in promoting bacteriological growth on their surfaces.

7. The method of claim 3 wherein the elements are shapes suitable for use in towers providing a high surface area between and liquid and gas phases.

8. The method of claim 7 wherein the elements are polymeric plastic molded foraminous spheres having multiple cross members inside.

9. The method of claim 3 wherein the weight means comprises the structure and material of ends closing the enclosure.

10. The method of claim 9 wherein the weight means comprises one end of foamed light density material and the other end composed of a solid high density material.

* * * * *